Patented Mar. 25, 1941

2,235,999

UNITED STATES PATENT OFFICE 2,235,999

CARBON PIGMENT AND PROCESS OF MAKING THE SAME

Simon Klosky, New Brunswick, N. J., assignor to The American Agricultural Chemical Company, Newark, N. J., a corporation of Delaware No Drawing. Application July 7, 1939, Serial No. 283,191

6 Claims. (Cl. 134—58)

The present invention relates to carbon pigments and a process of making the same; and, more particularly, it relates to a novel process of making carbon pigments from carbon-containing matter of vegetable origin by impregnation with phosphate materials and subsequent calcination, and to the carbon pigments so produced.

There are, at the present time, several varieties of carbon pigments, known or suggested, which are commonly designated in accordance with the raw material from which they are produced, e. g., lamp black, made by burning oil with an insufficiency of air; carbon black, made by burning natural gas in special burners; and bone black, made by burning bones in kilns and grinding the product.

So far as I know, however, there has never, heretofore, been any commercially practical or successful process for the manufacture of carbon pigments from carbonaceous matter of vegetable origin, for example wood or other cellulosic material, by impregnation with phosphates, nor any practically or commercially useful carbon pigments derived from such source.

Objects of the present invention include the provision of a novel and useful process for the manufacture of carbon pigments from vegetable carbon-containing materials, more particularly by impregnation with phosphate materials and subsequent calcination; and, further, the provision of a novel black, carbon pigment, so produced, and of vegetable origin, and of such a pigment containing phosphate material.

The novel compositions of matter according to my invention have been found to have high hiding and covering power, and excellent top-tone and tinting strength, together with other advantages and physical properties rendering them of value, in the practical and commercial arts, for use as black, carbon pigments.

Other objects and advantages of my invention will appear from the following description, and from the claims.

I have discovered that if carbon-containing matter of vegetable origin, as, for example, cellulosic material, is first impregnated with certain phosphate solutions, in the manner hereinafter described, and is then calcined and ground, as will also be described, the resulting black carbon pigments have the foregoing and other desirable properties and advantages. By proper control of the conditions of impregnation and calcination, all as will be hereafter set forth and exemplified in detail, my novel carbon pigments can be produced with an optimum of hiding and covering power, as well as good tinting strength, top-tone and other desirable properties.

I am aware that it has previously been suggested or proposed to impregnate certain carbon-containing matter of vegetable origin with various chemicals, as, for example, phosphoric acid, and thereafter to calcine the product in order to produce an activated vegetable carbon, suitable for decolorizing or gas adsorption use; but I have found that such products, so far as I have been able to ascertain, are not practically or commercially suitable for use as carbon pigments. I have found, in general, that they do not have the necessary properties rendering them suitable for use as pigments, being, in many instances, lacking in the requisite black top-tone, desirable in a good black carbon pigment, as well as lacking in hiding power, tinting strength, and other necessary or desirable physical properties, or having other objectionable defects.

One way in which my process may be carried out to produce examples of the novel compositions of matter which I have discovered, is as follows:

Using, by way of example, hardwood sawdust of medium size, as a starting material, the sawdust is first soaked in a special phosphate liquor containing tricalcium phosphate and sulfurous acid in such proportions, and at such a temperature (both of which are hereafter described), that the sulfurous acid holds the tricalcium phosphate in solution until it thoroughly penetrates the pores of the sawdust, after which the tricalcium phosphate is uniformly precipitated within the pores of the sawdust upon decomposition of the acid by heating.

This special phosphate-containing impregnating liquor may suitably be prepared by suspending tricalcium phosphate in water and then saturating the solution with sulfur dioxide. Ground phosphate rock is satisfactorily employed as the source of tricalcium phosphate. There results a partial solution of the tricalcium phosphate, which may be approximately represented by the equation:

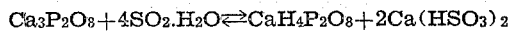

$$Ca_3P_2O_8 + 4SO_2 \cdot H_2O \rightleftharpoons CaH_4P_2O_8 + 2Ca(HSO_3)_2$$

The amounts of tricalcium phosphate and water are preferably regulated so that the resulting solution contains about 1.0% of $P_2O_5$, by analysis. Any insoluble or undissolved material is allowed to settle and the clear liquor is then applied to the sawdust and allowed to soak in until the sawdust is thoroughly impregnated. The sawdust, covered by the impregnating liquor, is then heated until the sulfurous acid is decomposed and sulfur dioxide escapes with the formation of a precipitate of dicalcium phosphate and calcium sulfite inside the pores of the sawdust. This heating may be carried out with steam, the mixture being heated to its boiling point for of the order of about 2 to 4 hours, while agitating the mass to facilitate escape of the sulfur dioxide. Heating is continued until evolution of the sulfur dioxide has practically ceased. This reaction may be substantially represented as follows:

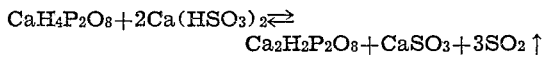

$CaH_4P_2O_8 + 2Ca(HSO_3)_2 \rightleftharpoons$
$Ca_2H_2P_2O_8 + CaSO_3 + 3SO_2 \uparrow$ The dicalcium phosphate and the calcium sulfite being thus precipitated together within the pores of the sawdust, the sawdust containing the precipitate is allowed to drain and to dry. It is then transferred to a kiln where it is calcined at a temperature of, for example, approximately 1500° to 1800° F. for about 1 to 2 hours.

During this calcination, most of the volatile matter contained in the sawdust is distilled off, and the dicalcium phosphate and calcium sulfite then react, in situ, to yield tricalcium phosphate, or a more basic phosphate, which thus becomes substantially uniformly distributed throughout the pores of the resulting black carbon pigment. The resulting product, after cooling and grinding, may be subjected to air or other suitable separation, and is found to yield a product which is generally superior, in covering and hiding power, tinting strength, top-tone, and other attributes, to regular bone black pigments and to many other prior black pigments.

While certain methods of treatment to form activated carbons for color removal or gas absorption purposes have heretofore been proposed, they have practically all, so far as I am aware, involved subsequent removal of a substantial part of any tricalcium, or more basic, phosphate present; and none of them, so far as I know, have ever resulted in the production of any material practically suitable for use as a black carbon pigment, or having the necessary and desirable physical properties to enable the material to be used commercially for that purpose.

In carrying out the specific reactions described above, employing solutions of tricalcium phosphate in sulfurous acid, proper regulation and control of the amount of $P_2O_5$ in the resulting product has been found to have an important effect in securing optimum results. I have discovered that while amounts of $P_2O_5$ between approximately 7% and 25%, in the calcined product, and of carbon of vegetable origin between approximately 25% and 80% in the calcined product, yield satisfactory physical properties, nevertheless, the preferred range, as at present advised, lies between approximately of the order of about 16% to 20% of $P_2O_5$ in the calcined product, with between about 40% and 60% of carbon of vegetable origin therein. This is found to give a product having excellent hiding and covering power and other desirable physical properties.

By carefully carrying out my process according to the foregoing instructions, the hiding power of the product, within the broader range of composition just stated, may be brought above about 100 square centimeters per gram of product (cm.²/gram) as measured on a Pfund cryptometer (as described by Gardner: "Physical & Chemical Examination of Paints," fifth edition, 1930) and, in the case of compositions within the preferred range, may exceed about 130 cm.²/gram,—reaching, in optimum cases, in excess of about 160 cm.²/gram.

The amount of $P_2O_5$ in the calcined product is best controlled, as at present advised, by controlling the concentration of $P_2O_5$ in the impregnating solution. I have found that a suitable range of concentration in the impregnation solution is from about 0.5% to about 2.5% $P_2O_5$; but the best concentration, so far as I am at present aware, is of the order of about 1% $P_2O_5$.

I have also found that the impregnation may be expedited by carrying it out under a pressure of about 20 pounds per square inch at about 100° C. The time for good results under these conditions is about 2 hours.

*Specific illustrative example*

The following is a detailed specific illustrative example of the process according to my invention. By carrying out the process according thereto, I have found that it yields an excellent product according to the invention, having hiding power in excess of about 130 cm.²/gram of the resulting calcined product; $P_2O_5$ in excess of about 7%, in the calcined product; carbon of vegetable origin less than about 80%, in the calcined product; and total ash (including $P_2O_5$) of about 30% in the calcined product:

Florida phosphate rock was placed in the bottom of a crock and the crock was filled with water. Sulfur dioxide from a cylinder was bubbled into the water for about 24 hours and the supernatant liquor was then syphoned off. This liquor contained about 0.76% $P_2O_5$. To approximately 6 lbs. of No. 8 hardwood sawdust, 80 lbs. of the resulting liquor was added, and the whole was allowed to stand over night. The liquor containing the sawdust was then heated with steam to approximately 100° C., and agitated for about 4 hours. At the end of that period the liquor was drained off and the impregnated material was calcined at about 1800° F. for approximately one hour. The resulting product was cooled, ground and air separated. It was found to contain, by analysis, approximately 70.35% carbon, 29.65% ash and 7.6% $P_2O_5$. The figure of 7.6% for the $P_2O_5$ is, of course, included in that of 29.65% for the ash. The hiding power of the resulting black carbon pigment, as measured by a Pfund cryptometer, was found to be approximately 130 cm.²/gram.

In general, I have found, by test and experience, that when the $P_2O_5$ content of the calcined product lies between approximately 7% and 25%, with a carbon content, in the calcined product, lying between about 35% and 80%, as indicated above, the hiding power of the product, in square centimeters per gram (cm.²/gram), as measured on a Pfund cryptometer (in the manner described by Gardner, already referred to) can generally be brought in excess of about 100, by properly and carefully carrying out the process in the manner described. Within the preferred range of $P_2O_5$ content of the calcined product (namely, approximately of the order of about 16% to 20% $P_2O_5$) with a carbon content, in the calcined product, of between about 40% and 60%, the hiding power of the final product can usually be brought above about 130 cm.²/gram; and, by careful work and with good materials, following the instructions given above, the hiding power may even be raised to values as high as, or in excess of, about 160 cm.²/gram, when the $P_2O_5$ content is about 18% and the carbon content about 54%, with total ash (including $P_2O_5$) about 46%. Thus the hiding power may be more than double the hiding power of an excellent grade of bone black, measured in the same way.

As used in the specification and claims herein, the term "basic calcium phosphate" includes tricalcium phosphate or any more basic phosphate —that is to say, any calcium phosphate in which the molal ratio of CaO to $P_2O_5$ is three or more to one—as, for example, tricalcium phosphate ($Ca_3P_2O_8$) or hydroxyapatite $$(Ca_{10}(P_2O_8)_3(OH)_2)$$

both of which have the chemical property of being "basic calcium phosphates." Thus, as stated above, tricalcium phosphate or phosphate rock ($Ca_{10}(P_2O_8)_3F_2$) may be used in preparing the impregnating solution. The term or expression "$P_2O_5$," as used in the specification and claims, signifies the amount of $P_2O_5$ as determined by analysis, and is usually expressed in that form in this art. The "$P_2O_5$" as thus expressed exists, substantially, in the form of basic calcium phosphate.

While the process and product herein described, and the examples given, are the best embodiments now known to me, it is to be understood that my invention is not necessarily or specifically limited thereto, but may be carried out in other ways and embodied in other products, without departure from its spirit, within the scope of the following claims.

I claim:

1. A process of manufacturing carbon pigments of vegetable origin, which comprises first preparing an impregnating solution containing calcium phosphate, by suspending raw material containing tricalcium phosphate in water, and saturating the resulting suspension with sulfur dioxide; then impregnating a carbon-containing material of vegetable origin with the resulting phosphate-containing solution; heating the impregnated material to decompose sulfurous acid in the solution and precipitate dicalcium phosphate and calcium sulfite within the pores of the carbon-containing material; and then calcining the impregnated precipitate-containing material until the volatile matter has been substantially distilled and dicalcium phosphate and calcium sulfite have reacted in situ to yield basic calcium phosphate substantially uniformly distributed throughout the pores of the resulting calcined carbon pigment.

2. The method of manufacturing black carbon pigments of vegetable origin, which comprises first impregnating a cellular carbonaceous material of vegetable origin with an impregnating solution containing calcium phosphate and sulfurous acid; then heating the impregnated material to decompose the sulfurous acid and precipitate dicalcium phosphate and calcium sulfite; and thereafter calcining the resulting product and causing reaction in situ between the dicalcium phosphate and the calcium sulfite to produce basic calcium phosphate distributed substantially uniformly throughout the pores of the resulting calcined material.

3. A novel vegetable black carbon pigment having a hiding power in excess of about one hundred square centimeters per gram, as determined upon a Pfund cryptometer, and comprising between about 7% and 25% $P_2O_5$ in the form of basic calcium phosphate and between about 35% and 80% of carbon, the phosphate material being substantially uniformly distributed throughout the pores of the carbon.

4. A novel vegetable black, calcined, carbon pigment having a hiding power in excess of about 100 square centimeters per gram, as determined upon a Pfund cryptometer, and comprising between about 7% and 25% of $P_2O_5$ in the form of basic calcium phosphate, in the calcined product, and between about 35% and 80% of carbon, of vegetable origin, in the calcined product.

5. A novel vegetable black, calcined, carbon pigment having a hiding power in excess of about 100 square centimeters per gram, as determined upon a Pfund cryptometer, and comprising between about 16% and 20% of $P_2O_5$ in the form of basic calcium phosphate, in the calcined product, and between about 40% and 60%, of carbon of vegetable origin, in the calcined product.

6. A black carbon pigment having the properties of high hiding power, high covering power, good top tone and good tinting strength, and characterized by the novel feature that it comprises a calcined vegetable carbon matter containing between about 16 and 20% by analysis of $P_2O_5$ existing substantially in the form of basic calcium phosphate and distributed substantially uniformly throughout the pores of the carbon, and having a hiding power in excess of about one hundred and thirty square centimeters per gram of pigment, as determined upon a Pfund cryptometer.

SIMON KLOSKY.

CERTIFICATE OF CORRECTION.

Patent No. 2,235,999. March 25, 1941.

SIMON KLOSKY.

It is hereby certified that error appears in the printed specification of the above numbered patent requiring correction as follows: Page 3, second column, line 36, claim 5, for the numeral "100" read --130--; and that the said Letters Patent should be read with this correction therein that the same may conform to the record of the case in the Patent Office.

Signed and sealed this 29th day of April, A. D. 1941.

(Seal)

Henry Van Arsdale,
Acting Commissioner of Patents.